Aug. 25, 1925.

C. N. F. KNAPÈ

1,551,312

BEARING AND LUBRICATING DEVICE THEREFOR

Filed Jan. 13, 1922

WITNESSES:
R. S. Harrison
A. Martin

INVENTOR
Charles N. F. Knape
BY
Wesley Sloan
ATTORNEY

Patented Aug. 25, 1925.

1,551,312

UNITED STATES PATENT OFFICE.

CHARLES N. F. KNAPE, OF WILKINSBURG, PENNSYLVANIA, ASSIGNOR TO WESTINGHOUSE ELECTRIC & MANUFACTURING COMPANY, A CORPORATION OF PENNSYLVANIA.

BEARING AND LUBRICATING DEVICE THEREFOR.

Application filed January 13, 1922. Serial No. 528,987.

*To all whom it may concern:*

Be it known that I, CHARLES N. F. KNAPE, a citizen of the United States, and a resident of Wilkinsburg, in the county of Allegheny and State of Pennsylvania, have invented a new and useful Improvement in Bearings and Lubricating Devices Therefor, of which the following is a specification.

My invention relates to bearings and lubricating devices, and it has for its object the provision of a bearing that is free from joints through which leakage of lubricant may occur and the provision of an improved means for lubricating such bearing.

Still another object of my invention is the provision of means whereby a bearing of the character designated may be readily assembled in the mechanism with which it is to be employed.

Another object of my invention is to provide a support for such bearing which may contain means whereby the lubrication of the bearing is facilitated and to simplify and improve generally the construction of bearings and the means for lubricating them.

Figure 1:
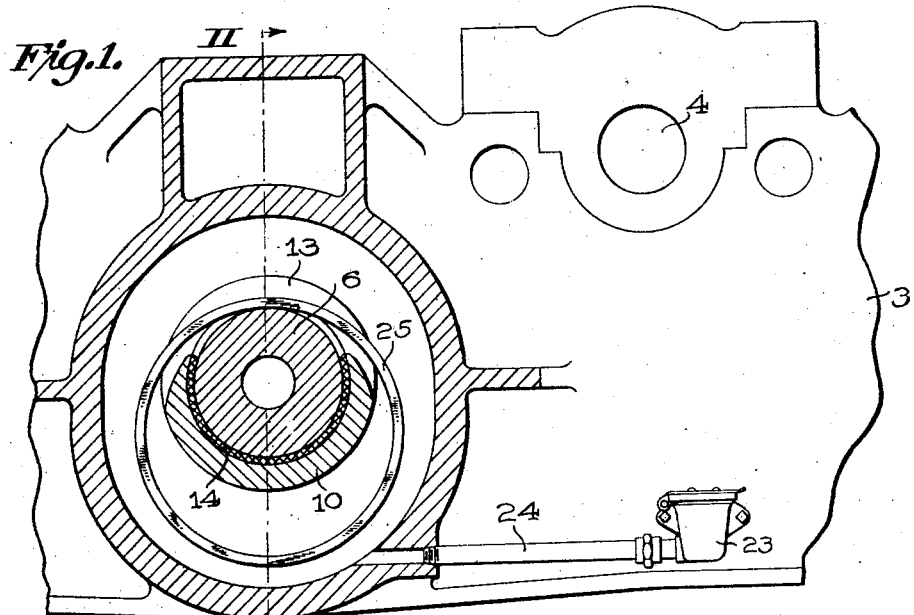
Figure 2:
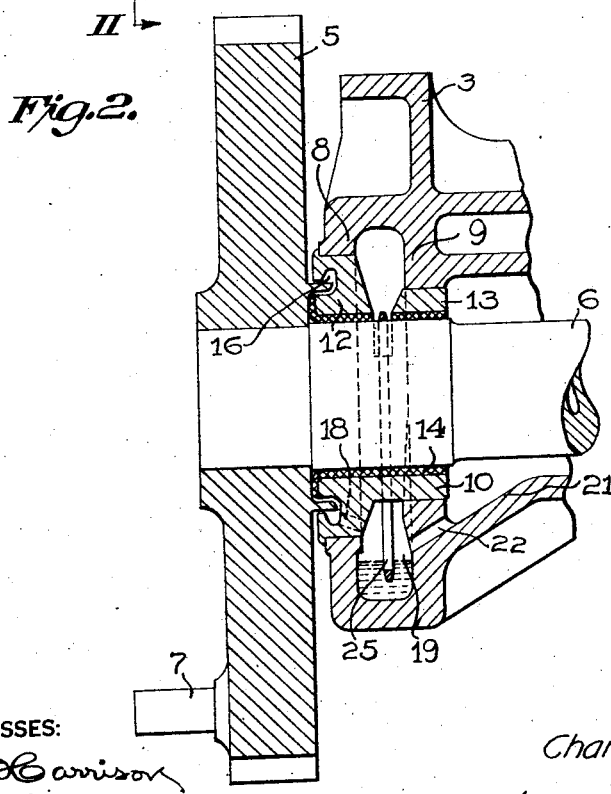

In the accompanying drawings,

Figure 1 is a view, partially in section and partially in side elevation, of a portion of a locomotive frame with my bearing applied thereto, and Fig. 2 is a view thereof taken on the line II—II of Fig. 1.

While my invention may be employed in connection with various forms of transmission mechanism, it is shown as applied to a locomotive, wherein a jack-shaft drive is employed. A locomotive side frame 3 is provided with a bore 4 for supporting a motor shaft, not shown, which carries a pinion that co-operates with the teeth of a gear 5. The gear 5 is secured to a jack-shaft 6 and is provided with a crank pin 7 to which a side rod, not shown, may be secured for transmitting power to driving wheels, not shown.

Only a portion of one side of the locomotive frame is shown and it will be understood that a side frame which is opposite to the frame 3 may be of a construction substantially identical with that which is herein described. The side frame 3 is provided with two vertically disposed flanges 8 and 9 that serve as supports for a bearing block 10.

It will be noted that the bore through the flange 8 is of larger diameter than is the bore through the flange 9 and that the bearing block 10 is provided with ribs 12 and 13 of dimensions corresponding to the bores of the flanges 8 and 9, respectively.

A bearing metal 14 of babbit, or any other suitable material is interposed between the bearing block 10 and the shaft 6 in the usual manner. The rib 12 is provided with an oil groove 16, and an oil deflector is provided upon the gear wheel 5. Surplus oil from this end of the bearing is deflected into the groove 16 and flows downwardly, through an orifice 18, into a well 19 that is located between the flanges 8 and 9 of the side frame 3.

Lubricant from the other end of the bearing 13 flows downwardly upon the shaft 6, along an inclined surface 21 of the side frame 3 and thence through an opening 22 into the well 19. The supply of oil to the well 19 is renewed through an oil cup 23 that communicates therewith through a passage 24.

The rib 13 is of smaller diameter than the opening through the flange 8, and an oil ring 25 is provided that is also of smaller dimension than the opening to the flange 8. This form of construction permits of convenient assembly because the oil ring may be slipped into place over the bearing 10 and the bearing then be pressed into position in the openings through the flanges 8 and 9, and, furthermore, this arrangement permits of making the bearing 10 of a single piece of material.

A slot is cut between the flanges 12 and 13 and through the lining 14, at the upper side thereof, so that the oil ring 25 may rest directly upon the shaft 6 and be rotated thereby to supply lubricant to the bearing in the usual manner.

From the foregoing description, it will be seen that I provide a structure wherein a one-piece bearing may be employed, thus eliminating crevices that are usually present in bearings and through which leakage of lubricant may occur, and that I provide a simplified form of lubricating device and also an improved form of support for the bearing which may constitute a portion of the main body of the apparatus with which the bearing is to be employed.

Various modifications in detail and general arrangement may be made without departing from the spirit and scope of the invention, as defined in the accompanying claims.

I claim as my invention:

1. A bearing comprising a bearing block that is provided on its periphery with two annular ribs of different external diameters, and a supporting structure with bearing surfaces provided upon the interior thereof in position to be engaged by the said ribs, the bearing surfaces constituting flanges of an integral supporting member and being spaced apart to provide a lubricant reservoir therebetween.

2. A bearing comprising a bearing block that is provided on its periphery with two annular ribs of different external diameters, a supporting structure with bearing surfaces provided upon the interior thereof in position to be engaged by the said ribs, the bearing surfaces constituting flanges of an integral supporting member and being spaced apart to provide a lubricant reservoir therebetween, an oil-collecting flange upon the exterior of one of the said ribs, and means for draining oil from the oil flange into the reservoir.

3. A bearing comprising a bearing block provided upon its exterior with two annular engaging surfaces of different diameters and a supporting structure provided interiorly thereof with flange portions in position to serve as seats for the said engaging surfaces, the flanges being connected at their bases and spaced apart to form an oil chamber.

4. A bearing comprising a bearing block provided upon its exterior with two annular engaging surfaces of different diameters, a supporting structure provided interiorly thereof with flange portions in position to serve as seats for the said engaging surfaces, and an oil ring disposed between the said flange portions, the said ring being of smaller outside diameter than the interior diameter of one of the said flange portions.

5. A bearing comprising a bearing block provided upon its exterior with two annular engaging surfaces of different diameters, a supporting structure provided interiorly thereof with flange portions in position to serve as seats for the said engaging surfaces, the flanges being integrally connected and provided with a space therebetween that serves as an oil chamber, an oil ring supported between the flanges, and means whereby lubricant is supplied by the oil ring to the interior-surface of the bearing block.

6. A bearing comprising a bearing block provided upon its exterior with two annular engaging surfaces of different diameters, a supporting structure provided interiorly thereof with flange portions in position to serve as seats for the said engaging surfaces, and an oil ring disposed between the said flange portions, the said ring being of smaller outside diameter than the interior diameter of one of the said flange portions and of larger outside diameter than the interior diameter of the other of said flange portions.

7. The combination with a shaft, of a bearing therefor comprising a bearing block cut away intermediate its ends to expose a portion of the shaft, bearing surfaces on the exterior of the block, adjacent to its ends, and two spaced supporting flanges of different diameters in position to be engaged by the said bearing surfaces.

8. The combination with a shaft, of a bearing therefor comprising a bearing block cut away intermediate its ends to expose a portion of the shaft, bearing surfaces on the exterior of the block, adjacent to its ends, two spaced supporting flanges of different diameters in position to be engaged by the said bearing surfaces, an oil reservoir between the flanges, and means for directing lubricant that may be exuded at the ends of the bearing block to the said reservoir.

9. The combination with a shaft, of a bearing therefor comprising a bearing block cut away intermediate its ends to expose a portion of the shaft, bearing surfaces on the exterior of the block, adjacent to its ends, two spaced supporting flanges of different diameters in position to be engaged by the said bearing surfaces, an oil reservoir between the flanges, means for directing lubricant that may be exuded at the ends of the bearing block to the said reservoir, and an oil ring supported upon the said exposed portion of the shaft.

10. The combination with a shaft, of a bearing therefor comprising a bearing block cut away intermediate its ends to expose a portion of the shaft, bearing surfaces on the exterior of the block, adjacent to its ends, two spaced supporting flanges of different diameters in position to be engaged by the said bearing surfaces, an oil reservoir between the flanges and means for directing lubricant that may be exuded at the ends of the bearing block to the said reservoir, the oil ring being of larger diameter than the interior diameter of one of the supporting flanges.

11. The combination with the side frame of a locomotive, provided with spaced walls that serve as a housing and are provided with openings of different diameters, of a shaft extending through said openings, and an annular bearing block for the shaft provided with surfaces that engage the walls of the said openings.

12. The combination with the side frame of a locomotive provided with spaced walls that serve as a housing and are provided with openings of different diameters, of a shaft extending through said openings, and an annular bearing block for the shaft provided with surfaces that have a press-fit engagement with the walls of the said openings.

13. The combination with the side frame of a locomotive provided with spaced walls that serve as a housing and are provided with openings of different diameters, of a shaft extending through said openings, and an annular bearing block for the shaft provided with surfaces that engage the walls of the said openings, the space between the walls of the side frame serving as an oil reservoir.

14. The combination with the side frame of a locomotive provided with spaced walls that serve as a housing and are provided with openings of different diameters, of a shaft extending through said openings, an annular bearing block for the shaft provided with surfaces that engage the walls of the said openings, the space between the walls of the side frame serving as an oil reservoir, an oil ring of smaller diameter than the opening through one of the walls of the side frame, and means whereby lubricant may be conveyed from the oil ring to the interior of the bearing block.

15. The combination with the side frame of a locomotive provided with spaced walls that serve as a housing and are provided with openings of different diameters, of a shaft extending through said openings, an annular bearing block for the shaft provided with surfaces that engage the walls of the said openings, the space between the walls of the side frame serving as an oil reservoir and the bearing block being cut away at a point intermediate the walls of the side frame to expose the shaft, and an oil ring supported by the exposed portion of the shaft.

16. The combination with the side frame of a locomotive provided with spaced walls that serve as a housing and are provided with openings of different diameters, of a shaft extending through said openings, an annular bearing block for the shaft provided with surfaces that engage the walls of the said openings, the space between the walls of the side frame serving as an oil reservoir and the bearing block being cut away at a point intermediate the walls of the side frame to expose the shaft, an oil ring supported by the exposed portion of the shaft, and means whereby lubricant exuded from the ends of the bearing is directed to the space between the walls of the side frame.

In testimony whereof, I have hereunto subscribed my name this 4th day of January 1922.

CHARLES N. F. KNAPE.